United States Patent [19]

Cohen et al.

[11] Patent Number: 5,218,052
[45] Date of Patent: Jun. 8, 1993

[54] OLEFIN POLYMERIZATION AND COPOLYMERIZATION PROCESS

[75] Inventors: Steven A. Cohen; Nicholas M. Karayannis, both of Naperville; Jerome A. Streeky, Plainfield; Benjamin S. Tovrog, Naperville, all of Ill.

[73] Assignee: Amoco Corporation, Chicago, Ill.

[21] Appl. No.: 793,821

[22] Filed: Nov. 18, 1991

Related U.S. Application Data

[63] Continuation-in-part of Ser. No. 650,443, Feb. 4, 1991, abandoned.

[51] Int. Cl.$^5$ .............................................. C08L 23/12
[52] U.S. Cl. ................................... 525/240; 525/247; 525/270; 525/320; 525/322; 525/243
[58] Field of Search ............... 525/240, 247, 270, 320, 525/322, 243

[56] References Cited

U.S. PATENT DOCUMENTS

| | | | |
|---|---|---|---|
| 4,128,606 | 12/1978 | Furutachi et al. | 525/247 |
| 4,339,557 | 7/1982 | Hasuo et al. | 525/247 |
| 4,499,247 | 2/1985 | Chiba et al. | 526/142 |
| 4,500,682 | 2/1985 | Chiba et al. | 525/240 |
| 4,547,552 | 10/1985 | Toyota et al. | 525/247 |
| 4,612,299 | 9/1986 | Arzoumanidis et al. | 526/124 |
| 4,829,038 | 5/1989 | Hoppin et al. | 526/351 |

*Primary Examiner*—Joseph L. Schofer
*Assistant Examiner*—R. H. Delmendo
*Attorney, Agent, or Firm*—James R. Henes; Wallace L. Oliver; Frank J. Sroka

[57] ABSTRACT

A multistage method for making a homopolymer or copolymer of an alpha-olefin having increased stiffness and broadened molecular weight distribution.

24 Claims, No Drawings

OLEFIN POLYMERIZATION AND COPOLYMERIZATION PROCESS

RELATED APPLICATION

This application is a continuation-in-part of copending U.S. patent application Ser. No. 07/650,443, filed Feb. 4, 1991, now abandoned.

BACKGROUND OF THE INVENTION

1. Field of the Invention

This invention relates to a process that is useful for polymerizing or copolymerizing propylene and more particularly concerns a process for producing a homopolymer or copolymer or propylene having increased stiffness and broadened molecular weight distribution.

2. Discussion of the Prior Art

Many homopolymers and copolymers of propylene have certain properties that are unsatisfactory for specific applications. For example, the stiffness or rigidity of certain homopolymers and copolymers of propylene, such as polypropylene and ethylene-propylene copolymers, is lower than the rigidity of polystyrene or ABS resin, and this fact has caused a serious restriction in broadening its application. In particular, biaxially stretched polypropylene films have inferior stiffness to cellophane and polyester films although they are packaging materials having excellent optical properties (such as transparency, luster, etc.) and moisture resistance. As a result, polypropylenes are not suitable for use in automatic packaging, especially overlap packaging and twist packaging, leading to a great limitation on their use. Moreover, even in cases where the polypropylene films can be made much thinner from the standpoint of moisture resistance and other properties, it is inevitably necessary to increase their film thickness to obtain stiffness. This is not only uneconomical but is also an obstacle to the miniaturization of electrical components such as dry condensers wherein a polypropylene film is used.

For example, if the rigidity of a polymer or copolymer of propylene is improved, it is possible to reduce the thickness of the resulting molded product formed from it. This is not only effective for the conservation of resources, but also the cooling rate at the time of molding can be increased; hence it is possible to make the molding rate per unit time faster and thereby improve the productivity in molding and processing.

Although many polymerization and copolymerization processes and catalyst systems have been described, it is advantageous to tailor a process and catalyst system to obtain a specific set of properties of a resulting polymer or copolymer product. For example, in certain applications a product with a broader molecular weight distribution is desirable. Such a product has a lower melt viscosity at high shear rates than a product with a narrower molecular weight distribution. Many polymer or copolymer fabrication processes which operate with high shear rates, such as injection molding, oriented film, and thermobonded fibers, would benefit with a lower viscosity product by improving throughput rates and reducing energy costs. Products with higher stiffness, as measured by flexural modulus, are important for injection molded, extruded, and film products since the fabricated parts can be down gauged so that less material would be needed to maintain product properties. Also important is maintaining high activity and low atactic levels such as measured by hexane soluble and extractable materials formed during polymerization or copolymerization. Thus, it is highly desirable to develop polypropylene having increased rigidity or stiffness and broadened molecular weight distribution.

For example, Chiba et al., U.S. Pat. No. 4,499,247 disclose a high-rigidity and high-melt-viscoelasticity polypropylene for sheets to be post-processed and for blow molding, which polypropylene is produced by subjecting propylene to a multi-stage polymerization into polymer portions of two sections in the presence of a specified Ziegler Natta catalyst. The catalyst is prepared by reacting or organoaluminum compound (I) or a reaction product (VI) of an organoaluminum compound (I) with an electron donor (A), with titanium tetrachloride (C); reacting the resulting solid product (II) with an electron donor (A) and an electron acceptor (B); and combining the resulting solid product (III), a titanium trichloride composition, with an organoaluminum compound (IV) and an aromatic carboxylic acid ester (V), so as to give a molar ratio of the aromatic carboxylic acid ester (V) to the solid product (III) of 0.1 to 10. The patent states that if a catalyst containing some other titanium trichloride composition instead of the aforesaid solid product (III), the desired beneficial results are not obtained. The relationship between the intrinsic viscosities of the polymer portions of the respective sections is regulated within a specified range and also the amount ratio of the polymer portions of the respective sections is regulated. The two polymer portions differ in their molecular weights, and this difference is produced by varying the concentration of hydrogen in the gas phase in the first stage from the concentration of hydrogen in the gas phase in the second stage. The aromatic carboxylic acid ester is employed as an external modifier (as described hereinbelow) in the polymerization in order to elevate the isotacticity of the resulting polypropylene. The polymerization can be carried out in the slurry or gas phase. Applications of polymers formed by a polymerization process employing essentially the same catalyst are disclosed in Fujishita et al., U.S. Pat. No. 4,560,734.

Chiba et al., U.S. Pat. No. 4,500,682, disclose a polypropylene having a superior post-processability and blow moldability, which polypropylene is obtained by polymerizing propylene in multiple stages using a catalyst comprising a titanium trichloride composition, an organoaluminmum compound and a molecular weight modifier, the resulting final polymer comprising a higher molecular weight portion and a lower molecular weight portion, and the final polymer consisting of 40 to 60 weight percent of polypropylene portion corresponding to the higher molecular weight portion and 60 to 40 weight percent of a polypropylene portion corresponding to the lower molecular weight portion. The gas-phase hydrogen concentration is adjusted from one stage to the next stage of polymerization in order to effect the production of polypropylene portions having different molecular weights in the different stages. The polymerization can be carried out in the slurry, bulk or gas phase.

Chiba et al., U.S. Pat. No. 4,550,144, disclose a propylene-ethylene block copolymer from which molded products having high rigidity and superior high impact properties can be prepared, which copolymer is obtained by (i) polymerizing propylene in 70 to 95 weight percent based on the total polymerized amount, using a catalyst obtained by reacting an organoaluminum compound (I) or a reaction product of (I) with an electron donor (A), with titanium tetrachloride, further reacting the resulting solid product (II) with (A) and an electron acceptor (B), and combining the resulting solid product (III) with an organoaluminum compound (IV) and an aromatic carboxylic acid ester (V), the molar ratio of (V) to (III) being 0.1 to 10.0, and then (ii) polymerizing ethylene or ethylene and propylene in 30 to 5 weight percent based on the total polymerized amount, in one or more stages, using the same aforesaid catalyst, the ethylene content being 3 to 20 weight percent based on the total polymerized amount. In specific examples of two-stage copolymerizations, the hydrogen concentration in the gas phase differs from one stage to the next stage. The copolymerization can be carried out in the slurry, bulk or gas phase. The patent states that if a catalyst containing titanium tetrachloride supported on a carrier such as magnesium chloride is employed instead of the aforesaid catalyst in the method disclosed therein, the described beneficial results are not obtained. Applications of the resulting copolymers are disclosed in Asakuno et al., U.S. Pat. No. 4,638,030.

Chiba et al., U.S. Pat. No. 4,582,878, disclose a high-rigidity, whitening-resistant ethylene-propylene copolymer, which is obtained by copolymerizing propylene with ethylene in three successive stages wherein in the respective first, second and third stages, a copolymer fraction having a specified ethylene content is formed in a specified amount based on the total polymerization amount, in the presence of a catalyst obtained by reacting an organoaluminum compound (L) or a reaction product thereof with an electron donor (E) with titanium tetrachloride; reacting the resulting solid product (I) with an electron donor (E) and an electron acceptor; and combining the resulting solid product (II) with an organoaluminum compound (L) and an aromatic carboxylic acid ester (R), the molar ratio of (R) to (II) being in the range of 0.1 to 10, and in the presence of hydrogen. The hydrogen concentration of the gas phase differs from one stage to the next stage of polymerization. The copolymerization can be carried out in the slurry, bulk or gas phase. The patent states that if a catalyst containing titanium tetrachloride supported on a carrier such as magnesium chloride is employed instead of the aforesaid catalyst in the method disclosed therein, the desired beneficial results are not obtained.

The use of other catalysts or catalyst components—namely, solid, transition metal-based catalyst components for the polymerization or copolymerization of alpha-olefins, including such solid components supported on a metal oxide, halide or other salt such as widely-described magnesium-containing, titanium halide-based catalyst components—than those described as being useful for the process disclosed in the aforesaid U.S. Pat. Nos. 4,499,247; 4,500,682; 4,550,144; and 4,582,878 is well known in the art. Such hydrocarbon-insoluble, magnesium-containing, titanium-containing catalyst components are described in Hoppin et al., U.S. Pat. No. 4,829,038, which is incorporated in its entirety herein by reference. Also known is incorporating an electron donor compound into the titanium-containing component as an internal modifier. An olefin polymerization system typically comprises a titanium-containing compound, an alkylaluminum compound and an electron donor external modifier compound. The electron donor external modifier used in combination with the alkyl aluminum compound and solid titanium-containing compound is distinct from the electron donor which may be incorporated as an internal modifier within the titanium-containing compound. Many classes of electron donors have been disclosed for possible use as electron donor external modifiers used during polymerization.

One class of such electron donor compounds is organosilanes. For example in U.S. Pat. No. 4,540,679, organosilanes, especially aromatic silanes, are described. Use of organosilanes as cocatalyst modifiers also is described in Published U.K. Application 2,111,066 and U.S. Pat. Nos. 4,442,276, 4,472,524, 4,478,660, and 4,522,930. Other aliphatic and aromatic silanes used in polymerization catalyst are described in U.S. Pat. Nos. 4,420,594, 4,525,555 and 4,565,798.

Hoppin et al., copending, U.S. patent application Ser. No. 410,663, filed Sep. 21, 1989, disclose specific branched $C_3-C_{10}$ alkyl-t-butoxydimethoxysilanes modifiers which not only are used in supported catalysts to provide high yield and low atactic products, but which also produce a polymer with a broader molecular weight distribution than produced using the organosilane compound selected from the group consisting of diisobutyldimethoxysilane diisopropyldimethoxysilane, di-t-butyldimethoxysilane and t-butyl-trimethoxysilane, and mixtures thereof, as described in Hoppin et al., U.S. Pat. No. 4,829,038, which as indicated hereinabove, in its entirety is specifically incorporated by reference herein.

Arzoumanidis et al., U.S. Pat. No. 4,866,022, discloses a method for forming a particularly advantageous alpha-olefin polymerization or copolymerization catalyst or catalyst component that is formed by a process that involves a specific sequence of specific individual process steps such that the resulting catalyst or catalyst component has exceptionally high activity and stereospecificity combined with very good morphology. A solid hydrocarbon-insoluble, alpha-olefin polymerization or copolymerization catalyst or catalyst component with superior activity, stereospecificity and morphology characteristics is disclosed as comprising the product formed by 1) forming a solution of a magnesium-containing species from a magnesium hydrocarbyl carbonate or magnesium carboxylate; 2) precipitating solid particles from such magnesium-containing solution by treatment with a transition metal halide and an organosilane; 3) reprecipitating such solid particles from a mixture containing a cyclic ether; and 4) treating the reprecipitated particles with a transition metal compound and an electron donor. This patent also discloses organosilanes that are useful as reagents in precipitating a solid from a soluble magnesium species and that have the formula $R_nSiR^1_{4-n}$ where n is 0 to 4, R is hydrogen or an alkyl, alkoxy, haloalkyl or aryl radical containing one to about ten carbon atoms or a halosilyl radical or haloalkylsilyl radical containing one to about eight carbon atoms, and $R^1$ is OR or a halogen. The patent also discloses that aliphatic or aromatic silanes are advantageously employed as electron donor external modifiers and that preferred aliphatic silanes include isobutyl-trimethoxysilane, diisobutyldimethoxysilane, diisopropyldimethoxysilane, di-t-butyldimethoxysilane, and t-butyltrimethoxysilane.

Arzoumanidis et al., U.S. Pat. No. 4,540,679, disclose a process for the preparation of an aforesaid magnesium hydrocarbyl carbonate by reacting a suspension of a magnesium alcoholate in an alcohol with carbon dioxide and reacting the magnesium hydrocarbyl carbonate with a transition metal component. Arzoumanidis et al., U.S. Pat. No. 4,612,299 disclose a process for the preparation of an aforesaid magnesium carboxylate by reacting a solution of a hydrocarbyl magnesium compound with carbon dioxide to precipitate a magnesium carboxylate and reacting the magnesium carboxylate with a transition metal component.

OBJECTS OF THE INVENTION

It is therefore a general object of the present invention to provide a method for the polymerization or copolymerization of propylene that affords an improved polymer or copolymer product.

More particularly, it is an object of the present invention to provide a method for the polymerization or copolymerization of propylene that affords a polymer or copolymer product having increased stiffness and broadened molecular weight distribution.

It is a related object of the present invention to provide an improve catalyst system for the polymerization or copolymerization of propylene to afford the aforesaid polymer or copolymer product having the aforesaid improved properties.

Other objects and advantages of the present invention will become apparent upon reading the following detailed description and appended claims.

SUMMARY OF THE INVENTION

These objects are achieved by the method of this invention for making a homopolymer or copolymer or propylene having increased stiffness and a broadened molecular weight distribution, comprising: polymerizing propylene or copolymerizing a mixture of propylene and an alpha olefin in the presence of a high activity catalyst system and a silane, and in at least two stages, comprising: (a) in one stage producing a homopolymer or copolymer having a relatively high molecular weight in the range of from about 350,000 to about 4,000,000 and comprising at least about 5 weight percent of the total amount of final homopolymer or copolymer of propylene produced, and (b) in another stage, either after or prior to stage (a), producing a homopolymer or copolymer having a relatively low molecular weight in the range of from about 50,000 to about 340,000 and comprising at least about 10 weight percent of the total amount of final homopolymer or copolymer of propylene produced; wherein the molecular weight of the final homopolymer or copolymer of propylene produced is in the range of from about 150,000 to about 1,500,000 and the $M_w/M_n$ ratio of the final homopolymer or copolymer of propylene produced is at least 6.0; wherein the products formed in steps (a) and (b) comprise at least about 50 weight percent of the total amount of final homopolymer or copolymer of propylene produced; wherein the aforesaid silane is $R_1(R_2)_xSi(OR_4)_y(OR_5)_z$ wherein $R_1$ and $R_2$ are the same or different and are each isopropyl, isobutyl, t-butyl, isopentyl, t-pentyl, neopentyl, phenyl, tolyl, naphthyl, or cycloC$(R_3)_{2n-1}$, wherein cycloC is a cyclobutyl, cyclopentyl or cyclohexyl cycloaliphatic ring attached to the silicon atom and $R_3$ is a hydrogen or an alkyl group having from 1 to 5 carbon atoms and is a substituent to the cycloaliphatic ring and wherein n is 4, 5 or 6 when the cycloaliphatic ring is cyclobutyl, cyclopentyl, or cyclohexyl, respectively, wherein $R_4$ and $R_5$ are the same or different and are each methyl, isopropyl, sec- or t-butyl, and wherein y is 1, 2 or 3, z is 0 or 1, y+z is 2 or 3 and x is 3−(y+z); wherein a molecular weight control agent is employed in at least one of stage (a) and stage (b) in a sufficient amount that a homopolymer or copolymer having a molecular weight in the respective molecular weight range for such stage is produced; and wherein the aforesaid catalyst system comprises a supported catalyst comprising a solid hydrocarbon-insoluble composite of a titanium-containing component supported on a magnesium-containing compound and a co-catalyst comprising a Group II or III metal alkyl.

DETAILED DESCRIPTION OF THE PREFERRED EMBODDIMENTS

The method of this invention is useful in the polymerization of propylene or the copolymerization of a mixture of propylene and an alpha-olefin such as ethylene, butene-1, pentene-1, 4-methylpentene-1, and hexene-1, as well as mixtures thereof. The method of this invention is particularly effective in the stereospecific polymerization of propylene or the copolymerization of a mixture of at least 80 mole percent of propylene with up to about 20 mole percent ethylene, or an aforesaid higher molecular weight alpha-olefin. Preferably, the mixture comprises propylene and ethylene. Most preferably, the method of this invention is employed for the homopolymerization of propylene.

According to the invention, a highly crystalline homopolymer of propylene or copolymer of propylene and an aforesaid alpha-olefin is prepared by contacting the monomer or mixture of monomers with the catalyst system described hereinbelow under polymerization or copolymerization conditions. Such conditions include a polymerization or copolymerization temperature and time, pressure(s) of the monomer(s), avoidance of contamination of catalyst, choice of polymerization or copolymerization medium in slurry processes, the use of a molecular weight control agent or other techniques to control the molecular weights of the homopolymer or copolymer produced in each such stage, and other conditions well known to persons of skill in the art. Slurry-bulk- and gas-phase polymerization or copolymerization processes are contemplated herein. Preferably the method of the present invention is performed in the slurry phase.

In the event that the method of this invention is employed for the copolymerization of propylene with, for example, ethylene, copolymerization could take place in all of the aforesaid stages, or, in the alternative, in only certain of the aforesaid stages while homopolymerization takes place in the remaining stages. In the latter case, for example, a homopolymer of propylene could be formed in one of stage (a) or stage (b), and the copolymer of ethylene and propylene could be formed in the other of stage (a) or stage (b). In the alternative, a homopolymer of propylene could be formed in each of stage (a) and stage (b), and the copolymer of ethylene and propylene could be formed in a stage that is performed after stages (a) and (b). Typically in the method of this invention, the stages are performed in sequence with the homopolymer or copolymer formed in one stage being introduced with additional monomer(s) into the next stage in the sequence, but could also be performed in parallel such that the homopolymer or copolymer formed in one stage is not introduced into a particular second stage but instead is combined with the homopolymer or copolymer formed in the particular second stage.

The method of this invention is practiced in at least two stages and preferably in two or three stages. Each of the at least two stages comprises at least one reactor in which polymerization or copolymerization takes place. Thus, the conditions employed in each reactor within a given stage must be within the respective ranges for such conditions for such stage, the conditions employed in one reactor may differ from the conditions employed in another reactor within the same stage. In a batch operation, all of the stages could be performed within a single reactor. In one—stage (a)—of the aforesaid at least two stages (a) and (b) and in the presence of the catalyst system described hereinbelow and silane described hereinbelow, the polymerization or copolymerization is conducted such that an aforesaid homopolymer or copolymer having a relatively high weight average molecular weight in the range of from about 350,000, preferably from about 600,000, to about 4,000,000, preferably to about 2,000,000, is produced in an amount of at least 5—and preferably from about 10 to about 70—weight percent of the total amount of the final homopolymer or copolymer of propylene produced by the method of this invention. A molecular weight control agent may also be employed in this stage in sufficient amounts under the other polymerization or copolymerization conditions employed such that a homopolymer or copolymer having a weight average molecular weight in the aforesaid range is produced. Any convenient molecular weight control agent that is conventionally employed in the polymerization or copolymerization of alpha-olefins can be employed in the method of this invention. Suitable such molecular weight control agents and techniques are well known to those skilled in the art and include hydrogen, diethyl zinc, control of the monomer(s) concentration(s) and polymerization temperature. Preferably, hydrogen is employed. The levels of the molecular weight control agent, such as hydrogen, that are suitable for achieving the desired homopolymer or copolymer weight average molecular weight are influenced by a number of factors including, for example, the specific catalyst, the type and amount of silane and metal alkyl cocatalyst, the reactor volume, the amount of diluent, the monomer concentration, and the reaction temperature and pressure employed, and can be illustrated on the basis of specific examples hereinbelow.

In another stage—stage (b)—which can be either before or after the above-described stage (a) for the production of relatively high weight average molecular weight homopolymer or copolymer—of the aforesaid at least two stages (a) and (b) and in the presence of the catalyst system described hereinbelow and silane described hereinbelow, the polymerization or copolymerization is conducted such that a homopolymer or copolymer having a relatively low weight average molecular weight in the range of from about 50,000, preferably from about 100,000, to about 340,000, preferably to about 250,000, is produced in an amount of at least 10—and preferably from about 20 to about 80—weight percent of the total amount of the final homopolymer or copolymer of propylene produced by the method of this invention. A molecular weight control agent may also be employed in this stage in sufficient amounts under the other conditions of polymerization or copolymerization employed such that a homopolymer or copolymer having a weight average molecular weight in the aforesaid range is produced. Any convenient molecular weight control agent that is conventionally employed in the polymerization or copolymerization of alpha-olefins can be employed in the method of this invention. Suitable such molecular weight control agents and techniques include hydrogen, diethyl zinc, control of the monomer(s) concentration(s) and polymerization temperature. Preferably, hydrogen is employed. The levels of the molecular weight control agent, such as hydrogen, that are suitable for achieving the desired homopolymer or copolymer weight average molecular weight are influenced by a number of factors including, for example, the specific catalyst, the type and amount of silane and metal alkyl cocatalyst, the reactor volume, the amount of diluent, the monomer concentration and the reaction temperature and pressure employed, and can be illustrated on the basis of specific examples hereinbelow.

In cases where it is desired to reduce the concentration of hydrogen from one stage to the next stage, this reduction can be effected by utilizing a hydrogen scavenger, or by diluting the hydrogen, for example, by adding additional propylene but no additional hydrogen, or, only with a slurry- or bulk-phase or a batch gas-phase polymerization or copolymerization, by venting or purging hydrogen from the gas space in the reactor containing the reaction mixture.

The weight average molecular weight of the final homopolymer or copolymer of propylene produced by the method of this invention is in the range of from about 150,000, preferably from about 200,000, to about 1,500,000, preferably to about 700,000. The weight average molecular weight distribution—as measured by gel permeation chromatography and indicated by the ratio of the weight average molecular weight ($M_w$) to the number average molecular weight ($M_n$)—of the final homopolymer or copolymer of propylene produced by the method of this invention is at least 6.0, and preferably from about 7 to about 50.

The amount of the high activity catalyst or catalyst component of the catalyst system employed in the method of this invention to be employed varies depending on choice of polymerization or copolymerization technique, reactor size, the identity and amount of the monomer to be polymerized or copolymerized, and other factors known to persons of skill in the art, and can be determined on the basis of the examples appearing hereinafter. Typically, the high activity catalyst or catalyst component is used in amounts ranging from about 0.5 to 0.02 milligram of catalyst to gram of total homopolymer or copolymer produced in all of the stages combined.

Irrespective of the polymerization or copolymerization process employed, polymerization or copolymerization should be carried out at temperatures sufficiently high to ensure reasonable polymerization or copolymerization rates and to avoid unduly long reactor residence times, but not so high as to result in the production of unreasonably high levels of stereorandom products due to excessively rapid polymerization or copolymerization rates. Generally, temperatures range from about 0°, preferably from about 20° C., to about 120° C., preferably to about 95° C., from the standpoint of attaining good catalyst performance and high production rates. More preferably, polymerization according to this invention is carried out at temperatures ranging from about 50° C. to about 80° C. Polymerization of propylene or copolymerization of propylene and an aforesaid alpha-olefin comonomer according to this invention is carried out at monomer pressures of about atmospheric or above. Generally, monomer pressures range from about 20 to about 600 psi, although in vapor phase polymerizations or copolymerizations, monomer pressures should not be below the vapor pressure at the polymerization or copolymerization temperature of propylene or the alpha-olefin comonomer to be copolymerized.

The total polymerization or copolymerization time for all of the stages combined in the method of this invention generally range from about 0.5 to several hours in batch processes with corresponding average residence times in continuous processes. Total polymerization or copolymerization times for all of the stages combined ranging from about 1 to about 8 hours are typical in autoclave-type reactions. Total polymerization or copolymerization times for all of the stages combined ranging from about ½ to several hours are generally sufficient in continuous slurry processes. In slurry, bulk and gas phase processes, the total polymerization or copolymerization time for all of the stages combined can be regulated as desired.

Diluents suitable for use in slurry polymerization or copolymerization processes include alkanes and cycloalkanes such as pentane, hexane, heptane, n-octane, isooctane, cyclohexane, methycyclopentane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene, chloronaphthalene, orthodichlorobenzene, tetrahydronaphthalene, decahydronaphthalene; high molecular weight liquid paraffins, including isoparaffins such as Isopar G ®, or Isopar H ® or mixtures thereof, and other well-known diluents. It is often desirable to purify the polymerization or copolymerization medium prior to use, such as by distillation, percolation through molecular sieves, contacting with a compound such as an alkylaluminum compound capable of removing trace impurities, or by other suitable means.

Examples of gas-phase polymerization or copolymerization processes in which the catalyst or catalyst component of this invention is useful include both stirred reactors and fluidized bed reactor systems and are described in U.S. Pat. Nos. 3,957,448; 3,965,083; 3,971,786; 3,970,611; 4,129,701; 4,101,289; 3,652,527; and 4,003,712, all incorporated by reference herein. Typical gas phase olefin polymerization or copolymerization reactor systems comprise at least one reactor vessel to which olefin monomer(s) and catalyst components can be added and which contain an agitated bed of forming polymer particles. Typically, catalyst components are added together or separately through one or more valve-controlled ports in the single or first reactor vessel. Olefin monomer, typically, is provided to the reactor through either a recycle gas system, a quench liquid system or a combination of both. Unreacted monomer is removed as off-gas and either wholly or partially condensed, the liquid portion pumped and the vapor portion recompressed for returning to the reactor system. These streams can be fed separately or mixed into a single stream. For copolymerization, terpolymerization, etc., typically the homopolymer formed from the first monomer in the first reactor is reacted with the second monomer, a mixture of first monomer and second monomer or a higher mixture of multiple monomers in the second reactor. The monomers can be added through either a recycling gas system, a quench liquid system or a combination of both. Alternately, the polymerization can be continued through third and higher stage polymerizations by passing the resulting powder exiting the second reactor to a third, fourth and succeeding reactors through similar techniques. In yet another alternative, a copolymer could be formed in the first stage or first reactor.

Irrespective of the polymerization or copolymerization technique employed, polymerization or copolymerization is carried out under conditions that exclude oxygen, water, and other materials that act as catalyst poisons. If desired, upon completion of polymerization or copolymerization, or when it is advantageous to terminate polymerization or copolymerization or at least temporarily deactivate the catalyst or catalyst component of this invention, the catalyst can be contacted with water, moist nitrogen, alcohols, acetone, or other suitable catalyst deactivators in a manner known to persons of skill in the art.

The products produced in accordance with the process of this invention are normally solid, predominantly isotactic homopolymers of propylene or copolymers of propylene and the aforesaid other alpha-olefin monomer. Homopolymer or copolymer yields are sufficiently high relative to the amount of catalyst employed so that useful products can be obtained and used without separation of catalyst residues. The homopolymer or copolymer formed by the method of this invention has an increased stiffness as indicated, for example, for polypropylene homopolymer, by a compression-molded flexural moduli of at least 285,000 psi and preferably at least 295,000 psi, and by an injection-molded flexural moduli of at least 245,000 psi, and preferably at least 255,000 psi. The homopolymer or copolymer formed by the method of this invention has a broadened molecular weight distribution as indicated by a ratio of its weight average molecular weight ($M_w$) to its number average molecular weight ($M_n$) of at least 6.0 and preferably from about 7 to about 50. In addition, the homopolymer or copolymer formed by the method of this invention has a high tactility—as measured by $^{13}$C-NMR and reported as %m based on the method reported in Macromolecules, Vol. 6, page 925 (1973) and Vol. 8, page 687 (1975)—of at least 96.5% and preferably at least 97.5%. The product of the method of this invention also has a useful melt flow rate of at least about 0.1 up to about 200 grams per 10 minutes, a melting point in the range of 160° C. to 168° C. and a high heat of fusion of at least about 24 calories per gram as measured by differential scanning calorimetry. Polypropylene homopolymer produced by the method of this invention contains less than 2.0% and preferably less than 1.4 weight percent of hexane extractables as measured by a 3 hour extraction. In the case of a slurry or bulk-phase operation, in order to separate and recover a polymer or copolymer product from the polymerization reaction medium with the lowest possible level of stereorandom components in the product, it is particularly advantageous to separate the product from the liquid reaction medium by, for example, filtration, decantation, or centrifugation, at a temperature of at least 18° C.

The homopolymeric or copolymeric products produced in accordance with the method of the present invention can be fabricated into useful articles by extrusion, injection molding, blow molding, thermoforming and other common techniques. Such products may, if necessary or desired, contain an additive such as heat stabilizers, antioxidant, UV absorber, antilocking agent, coloring agent, etc. A nucleus creating agent may, if desired, be employed to further enhance the stiffness of the product.

It is an essential feature of the method of this invention that the catalyst system employed therein comprises the catalyst or catalyst component described hereinbelow and a cocatalyst component comprising a Group II or III metal alkyl. Group II and IIIA metal alkyls that are suitable for use as such cocatalyst component are compounds of the formula $MR_m$ wherein M is a Group II or IIIA metal, each R is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl. From the standpoint of catalyst component performance, preferred Group II and IIIA metal alkyls are those of magnesium, zinc, or aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)$ $(C_8H_{17})$, $Zn(C_4H_9)$ $(C_6H_{13})_1$, $Zn(C_6H_{13})_2$, $Zn(C_{12}H_{25})_2$, and $Al(C_{12}H_{25})_2$. More preferably a magnesium, zinc, or aluminum alkyl containing 1 to about 6 carbon atoms per alkyl radical is used. Best results are achieved through the use of trialkylaluminum compounds containing from 1 to about 6 carbon atoms per alkyl radical, and particularly trimethylaluminum, triethylaluminum and triisobutylaluminum, or a combination thereof. If desired, metal alkyls having one or more halogen or hydride groups can be employed, such as ethylaluminum dichloride, diethylaluminum chloride, ethylaluminum sesquichloride, diethylaluminum hydride, diisobutylaluminum hydride, and the like.

In addition to the catalyst or catalyst component described hereinbelow and aforesaid cocatalyst component, the catalyst system employed in the method of the present invention must include at least one member of a specific class of aliphatic or aromatic organosilane compounds. Such specific class comprises either (1) $R_1(R_2)_xSi(OR_4)_y(OR_5)_z$ wherein $R_1$ and $R_2$ are the same or different and are each isopropyl, isobutyl, sec-butyl, t-butyl, isopentyl, t-pentyl, neopentyl, phenyl, tolyl, naphthyl, or cycloC$(R_3)_{2n-1}$, wherein cycloC is a cyclobutyl, cyclopentyl or cyclohexyl cycloaliphatic ring attached to the silicon atom and $R_3$ is hydrogen or an alkyl group having from 1 to 5 carbon atoms and is a substituent to the cycloaliphatic ring, and wherein n is 4, 5 or 6 when the cycloaliphatic ring is cyclobutyl, cyclopentyl or cyclohexyl, respectively, wherein $R_4$ and $R_5$ are the same or different and are each methyl, isopropyl, or sec- or t-butyl, and, wherein y is 1, 2 or 3, z is 0 or 1, y+z is 2 or 3, and x is $3-(y+z)$. Preferably, z is 0, y is 2, $R_4$ is methyl or t-butyl, x is 1 and $R_1$ and $R_2$ are the same or different and are each isopropyl, isobutyl, t-butyl, isopentyl, t-pentyl, or neopentyl. Typically, the silane employed as an external modifier in the method of this invention is diisopropyldimethoxysilane, diisobutyldimethoxysilane, di-t-butyldimethoxysilane, t-butyltrimethoxysilane, diisopentyldimethoxysilane, di-t-pentyldimethoxysilane, dineopentyldimethoxysilane, neopentyltrimethoxysilane, isobutylisopropyldimethoxysilane, isobutyl-t-butyldimethoxysilane, and iso-propyl-t-butyldimethoxysilane and di-p-tolyldimethoxysilane. Preferably, the silane employed as an external modifier is diisopropyldimethoxysilane or di-t-butyldimethoxysilane.

The use of the aforesaid hindered alkylalkoxysilanes as an external modifier of the aforesaid catalyst in the catalyst system employed in the method of this invention is essential in order to control the steroregularity of the homopolymer or copolymer of propylene produced in the method of this invention. If no or some other silane external modifier is employed, the resulting homopolymer or copolymer of propylene produced in the method of this invention does not have a sufficient NMR tacticity and stiffness.

The aforesaid silane is present in the catalyst system employed in the method of this invention at a molar ratio of the metal in the cocatalyst to silane in the range of from about 1, preferably from about 3, to about 50, preferably to about 30.

Thus, a typical catalyst system for the polymerization of propylene or copolymerization of propylene with another aforesaid alpha-olefin monomer by the method of this invention is formed by combining the supported titanium-containing catalyst or catalyst component described hereinbelow and an aforesaid alkyl aluminum compound, together with the aforesaid silane as an external modifier. Typically, useful aluminum-to-titanium atomic ratios in such catalyst systems are about 10 to about 500 and preferably about 30 to about 400. Typical aluminum-to-silane compound molar ratios in such catalyst systems are about 3 to about 30.

Optionally, it is preferred in the method of this invention to employ an organic acid mono-, di-, or tri-ester as an additional external modifier in the catalyst system in order to substantially enhance the stiffness of the homopolymer or copolymer product while realizing the high activity of the catalyst system and the production of a homopolymer or copolymer having a low level of hexane extractables. Preferred organic acid esters for use as external modifiers are alkyl, alicyclic, alkenyl, aryl, alkaryl and aralkyl esters of benzoic acid, halobenzoic acids, alkylbenzoic acids, haloalkylbenzoic acids, alkoxybenzoic acids, alkylalkoxybenzoic acids, o-phthalic acid, isophthalic acid, terephthalic acid, naphthalene mono- and dicarboxylic acids, and biphenyl mono- and dicarboxylic acids. Additional preferred organic esters include alkyl, alkenyl, aryl, alkaryl, and aralkyl esters of acetic acid, propionic acid, valeric acid, pivalic acid, cycloaliphatic carboxylic acids and diacids, oxalic acid, adipic acid, stearic acid, and malonic and substituted malonic acids.

Examples of esters that are useful as external modifiers are ethyl-p-toluate, ethyl pivalate, methyl-4-t-butylbenzoate, 2,6-dimethyl naphthalene dicarboxylate, ethyl benzoate, n-butybenzoate, t-butylbenzoate, methyl-p-toluate, hexyl benzoate, cyclohexyl benzoate, di-di(ethyl)phthalate, di-(n-butyl)phthalate, di(isobutyl)phthalate, butylbenzylphthalate, di-(2-ethylhexyl)phthalate, ethyl-o-toluate, ethylcyclopropane carboxylate, monomethylterephthalate, and dimethyl terephthalate.

A particularly preferred method for utilizing an aforesaid ester external modifier is to add the ester to the polymerization system separately from aforesaid solid catalyst, metal alkyl and aforesaid silane in order to minimize the likelihood of reactions between the ester with such other components of the catalyst system.

The aforesaid organic acid ester is employed in the catalyst system employed in the method of this invention at an ester to titanium molar ratio in the range of from 0, preferably from about 5, to about 300, preferably to about 150.

In order to maximize the activity and stereospecificity of this catalyst system, one or more additional external modifiers, typically electron donors, and including compounds such as mineral acids, organometallic chalcogenide derivatives of hydrogen sulfide, organic acids, and mixtures thereof are optionally employed. Organic electron donors that are useful as such additional external modifiers of the aforesaid catalyst system are organic compounds containing oxygen, nitrogen, sulfur, and/or phosphorus. Such compounds include organic acids, organic acid anhydrides, alcohols, ethers, aldehydes, ketones, amines, amine oxides, amides, thiols, various phosphorus acid esters and amides, and the like. Mixtures of organic electron donors can also be employed.

Titanium-containing catalyst components that are useful in this invention are supported on hydrocarbon-insoluble, magnesium-containing compounds which are optionally in combination with an electron donor compound as an internal modifier. Such supported titanium-containing olefin polymerization catalyst component typically is formed by reacting a titanium (IV) halide, a magnesium-containing compound, and optionally an organic electron donor compound. Optionally, as described hereinbelow, such supported titanium-containing reaction product may be further treated or modified by comminution or further chemical treatment with additional electron donor or Lewis acid species.

Suitable magnesium-containing compounds include magnesium halides; a reaction product of a magnesium halide such as magnesium chloride or magnesium bromide with an organic compound, such as an alcohol or an organic acid ester, or with an organometallic compound of metals of Groups I-III; magnesium alcoholates; or magnesium alkyls.

One possible magnesium-containing compound, described in U.S. Pat. No. 4,277,370, is based on at least one magnesium alcoholate which may be pretreated with at least one modifier such as a mineral acid or anhydride of sulfur, organometallic, chalcogenide derivative of hydrogen sulfide, and organic acids and esters thereof. Such magnesium-containing compound may be the pretreatment product of at least one magnesium alcoholate, at least one Group II or IIIA metal alkyl and, optionally, at least one modifier such as a mineral acid or an anhydride, sulfur, organometallic chalcogenide derivatives of hydrogen sulfide, organic acids and organic acid esters. Solid magnesium alkoxide may be milled prior to further treatment. In another catalyst component, magnesium ethoxide may be reacted with an aromatic ester such as phenyl benzoate prior to further treatment with a Lewis acid.

Another possible catalyst component is described in U.S. application Ser. No. 674,966, filed Dec. 26, 1984, assigned to a common assignee, which is incorporated by reference herein. The catalyst component described therein is prepared by complexing a magnesium alkyl composition with a specific class of hindered aromatic ester such as ethyl 2,6-dimethylbenzoate followed by reaction with a compatible precipitation agent such as silicon tetrachloride and a suitable titanium (IV) compound in combination with an organic electron donor compound in a suitable diluent.

Another possible catalyst component of use in this invention is the TK catalyst component, a proprietary titanium halide-based magnesium chloride-containing catalyst component produced commercially by Akzo Chemicals, Inc.

Another possible, and preferable, catalyst component is described in U.S. Ser. No. 875,180, filed Jun. 17, 1986, which is a continuation-in-part to U.S. application Ser. No. 741,858, filed Jun. 6, 1985, which was a continuation-in-part to U.S. application Ser. Nos. 629,910, filed Jul. 9, 1984, and 592,910, filed Mar. 23, 1984, now the above-described U.S. Pat. No. 4,540,679, all of which are assigned to a common assignee and are incorporated by reference herein.

The possible solid catalyst components listed above are only illustrative of many possible solid, magnesium-containing, titanium halide-based, hydrocarbon-insoluble catalyst components useful in this invention and known to the art. This invention is not limited to a specific supported catalyst or catalyst component.

Titanium (IV) compounds useful in preparing the solid titanium-containing catalyst component of invention are titanium halides and haloalcoholates having 1 to about 20 carbon atoms per alcoholate group. Mixtures of titanium compounds can be employed if desired. Preferred titanium compounds are the halides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OCH_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides, particularly titanium tetrachloride ($TiCl_4$), are most preferred.

Organic electron donors useful as internal modifiers in preparation of stereospecific supported titanium-containing catalyst components many times can be organic compounds containing one or more atoms of oxygen, nitrogen, sulfur, and phosphorus. Such compounds include organic acids, organic acid esters, alcohols, ethers, aldehydes, ketones, amines, amine oxides, amides, thiols and various phosphorous acid esters and amides, and the like. Mixtures of organic electron donors can be used if desired. Specific examples of useful oxygen-containing electron donor compounds include organic acids and esters. Useful organic acids contain from 1 to about 20 carbon atoms and 1 to about 4 carboxyl groups.

Preferred titanium component electron donor compounds as internal modifiers include esters of aromatic acids. Preferred organic electron donors are $C_1-C_6$ alkyl esters of aromatic mono- and dicarboxylic acids and halohydroxyl-, oxo-, alkyl-, alkoxy-, aryl-, and aryloxy-substituted aromatic mono-and dicarboxylic acids. Among these, the alkyl esters of benzoic and halobenzoic acids wherein the alkyl group contains 1 to 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are preferred. Other preferable esters include ethyl p-anisate and methyl-p-toluate. An especially preferred aromatic ester is a dialkylphthalate ester in which the alkyl group contains from about two to about ten carbon atoms. Examples of preferred phthalate ester are diisobutylphthalate, ethylbutylphthalate, diethylphthalate, and di-nbutylphthalate.

The electron donor component that may be used as internal modifiers in preparation of the solid catalyst component is used in an amount ranging from about 0.001 to about 1.0 mole per gram atom of titanium, and preferably from about 0.005 to about 0.9 mole per gram atom. Best results are achieved when this ratio ranges from about 0.01 to about 0.8 mole per gram atom of titanium.

Although not required, the solid reaction product prepared as described herein may be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the above-described solid reaction product. Preferred Lewis acids include halides of Group III-V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixtures of Lewis acids can be employed if desired. Such Lewis acid may be used in a compatible diluent.

Although not required, the above-described solid reaction product may be washed with an inert liquid hydrocarbon or halogenated hydrocarbon before contact with a Lewis acid. If such a wash is conducted it is preferred to substantially remove the inert liquid prior to contacting the washed solid with the Lewis acid.

Due to the sensitivity of catalyst components to catalyst poisons such as water, oxygen, and carbon oxides, the catalyst components are prepared in the substantial absence of such materials. Catalyst poisons can be excluded by carrying out the preparation under an atmosphere of an inert gas such as nitrogen or argon, or an atmosphere of alpha-olefin. As noted above, purification of any diluent to be employed also aids in removing poisons from the preparative system.

As a result of the above-described preparation there is obtained a solid reaction product suitable for use as a catalyst component. Prior to such use, it is desirable to remove incompletely-reacted starting materials from the solid reaction product. This is conveniently accomplished by washing the solid, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance.

Although the chemical structure of the catalyst components described herein is not presently known, the components preferably contain from about 1 to about 6 weight percent titanium, from about 10 to about 25 weight percent magnesium, and from about 45 to about 65 weight percent halogen. Preferred catalyst components made according to this invention contain from about 1.0 to about 3 weight percent titanium, from about 15 to about 21 weight percent magnesium and from about 55 to about 65 weight percent chlorine.

Prior to use in the method of this invention the catalyst or catalyst component employed can be further activated by comminution. Techniques of comminution by ball-milling generally are known in the art. Typically, the catalyst component and hard, nonreactive balls, such as steel or Carborundum balls, are placed in a closed container which is agitated usually by rolling, shaking or rocking. Such comminution is continued for a few hours up to several days, typically about 12 to 36 hours, until the catalyst or catalyst component is ground to a desired particle size typically about 5 to about 50 microns. Since the mechanical action of comminution can cause a temperature increase in the comminuting mixture, care should be taken to keep the temperature below the decomposition temperature of the catalyst or catalyst component. Typically, the comminuting mixture should be kept at below about 50° C.

The titanium-containing catalyst component of this invention may be prepolymerized with an alpha-olefin before use as a polymerization catalyst component. In prepolymerization, catalyst and an organoaluminum compound cocatalyst such as triethylaluminum are contacted with an alphaolefin such as propylene under polymerization conditions, preferably in the presence of a modifier such as a silane and in an inert hydrocarbon such as hexane. Typically, the polymer/catalyst weight ratio of the resulting prepolymerized component is about 0.1:1 to about 20:1. Prepolymerization forms a coat of polymer around catalyst particles which in many instances improves particle morphology, activity, stereospecificity, and attrition resistance. A particularly useful prepolymerization procedure is described in U.S. Pat. No. 4,579,836, which is incorporated herein by reference.

As indicated hereinabove, the titanium-containing catalyst component of this invention is used in a polymerization catalyst system containing a cocatalyst component including a Group II or III metal alkyl, and, preferably, an alkyl aluminum compound, together with the aforesaid organosilane component.

Preferably, the solid, hydrocarbon-insoluble catalyst or catalyst component employed in the method of this invention for the polymerization of propylene or copolymerization of propylene and another alpha-olefin monomer comprises the product formed by the process which comprises the step (A) of forming a solution of a magnesium-containing species in a liquid wherein the magnesium-containing species is formed by reacting a magnesium-containing compound with carbon dioxide or sulfur dioxide. The magnesium-containing compound from which the magnesium-containing species is formed is a magnesium alcoholate, a magnesium hydrocarbyl alcoholate, or a hydrocarbyl magnesium compound. When carbon dioxide is employed, the magnesium-containing species is a hydrocarbyl carbonate or a carboxylate. When sulfur dioxide is employed, the resulting magnesium-containing species is a sulfonate. Since the use of carbon dioxide is highly preferred, hereinafter the description is written as if carbon dioxide is used.

When a magnesium alcoholate is employed, the resulting magnesium-containing species is a magnesium hydrocarbyl carbonate. Generally, the magnesium hydrocarbyl carbonate can be prepared by reacting carbon dioxide with the magnesium alcoholate. For example, the magnesium hydrocarbyl carbonate can be formed by suspending magnesium ethoxide in ethanol, adding carbon dioxide until the magnesium ethoxide dissolves forming magnesium ethyl carbonate. If, however, the magnesium ethoxide were suspended instead in 2-ethylhexanol, at least one of magnesium 2-ethylhexyl carbonate, magnesium ethyl carbonate and magnesium ethyl/2-ethylhexyl carbonate is formed. If the magnesium ethoxide is suspended in a liquid hydrocarbon or halohydrocarbon that is free of alcohol, the addition of carbon dioxide results in the breaking apart of the magnesium ethoxide particles and the magnesium hydrocarbyl carbonate reaction product does not dissolve. The reaction of a magnesium alcoholate with carbon dioxide can be represented as follows:

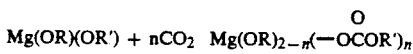
$$Mg(OR)(OR') + nCO_2 \rightarrow Mg(OR)_{2-n}(-OCOR')_n$$

wherein n is a whole number or fraction up to 2, and wherein R and R' are identical or different hydrocarbyl groups of 1 to 20 carbon atoms. From the standpoint of cost and availability, magnesium alcoholates which are preferred for use according to this invention are those of the formula $Mg(OR')_2$ wherein R' is as defined above. In terms of catalytic activity and stereospecificity, best results are achieved through the use of magnesium alcoholates of the formula $Mg(OR')_2$ wherein R' is an alkyl radical of 1 to about 8 carbon atoms, an aryl radical of 6 to about 12 carbon atoms or an alkaryl or aralkyl radical of 6 to about 12 carbon atoms. Best results are attained through the use of magnesium ethoxide.

Specific examples of magnesium alcoholates that are useful according to this invention include the following: $Mg(OCH_3)_2$, $Mg(OC_2H_5)_2$, $Mg(OC_4H_9)_2$, $Mg(OC_6H_5)_2$, $Mg(OC_6H_{13})_2$, $Mg(OC_9H_{19})_2$, $Mg(OC_{10}H_7)_2$, $Mg(OC_{12}H_9)_2$, $Mg(OC_{12}H_{25})_2$, $Mg(OC_{16}H_{33})_2$, $Mg(OC_{18}H_{37})_2$, $Mg(OC_{20}H_{41})_2$, $Mg(OCH_3)(OC_2H_5)$, $Mg(OCH_3)(OC_6H_{13})$, $Mg(OC_2H_5)(OC_8H_{17})$, $Mg(OC_6H_{13})(OC_{20}H_{41})$, $Mg(OC_3H_7)(OC_{10}H_7)$, $Mg(OC_2H_4Cl)_2$ and $Mg(OC_{16}H_{33})(OC_{18}H_{37})$. Mixtures of magnesium alcoholates can also be employed if desired.

A suitable magnesium hydrocarbyl alcoholate has the formula MgR(OR') wherein R and R' are as defined hereinabove for the magnesium alcoholate. On the one hand, when alcohol is used as the suspending medium for the reaction between the magnesium hydrocarbyl alcoholate and carbon dioxide or sulfur dioxide, the magnesium hydrocarbyl alcoholate is a functional equivalent of the magnesium alcoholate because the magnesium hydrocarbyl alcoholate is converted to the magnesium alcoholate in alcohol. On the other hand, when the suspending medium does not contain alcohol, the magnesium hydrocarbyl alcoholate reacts with carbon dioxide as follows:

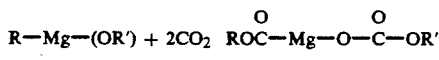
$$R-Mg-(OR') + 2CO_2 \rightarrow ROC(O)-Mg-O-C(O)-OR'$$

In this case,

$$ROC(O)-Mg-O-C(O)-OR'$$

is the resulting magnesium-containing species.

When the magnesium compound from which the magnesium-containing species is formed is a hydrocarbyl magnesium compound having the formula XMgR, where X is a halogen and R is a hydrocarbyl group of 1 to 20 carbon atoms, the reaction of the hydrocarbyl magnesium compound with carbon dioxide forms a magnesium carboxylate and can be represented as follows:

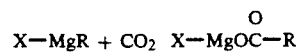
$$X-MgR + CO_2 \rightarrow X-MgOC(O)-R$$

If the hydrocarbyl magnesium compound contains two hydrocarbyl groups, the reaction can be represented as follows:

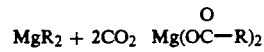
$$MgR_2 + 2CO_2 \rightarrow Mg(OC(O)-R)_2$$

where R is as defined for X-MgR.

Suitable hydrocarbyl magnesium compounds have the structure R-MgQ wherein Q is hydrogen, halogen or R' (each R' is independently a hydrocarbyl group of 1 to 20 carbon atoms.) Specific examples of hydrocarbyl magnesium compounds useful in this invention include: $Mg(CH_3)_2$, $Mg(C_2H_5)_2$, $Mg(C_4H_9)_2$, $Mg(C_6H_5)_2$, $Mg(C_6H_{13})_2$, $Mg(C_9H_{19})_2$, $Mg(C_{10}H_7)_2$, $Mg(C_{12}H_9)_2$, $Mg(C_{12}H_{25})_2$, $Mg(C_{16}H_{33})_2$, $Mg(C_{20}H_{41})_2$, $Mg(CH_3)(C_2H_5)$, $Mg(CH_3)(C_6H_{13})$, $Mg(C_2H_5)(C_8H_{17})$, $Mg(C_6H_{13})(C_{20}H_{41})$, $Mg(C_3H_7)(C_{10}H_7)$, $Mg(C_2H_4Cl)_2$ and $Mg(C_{16}H_{33})(C_{18}H_{37})$, $Mg(C_2H_5)(H)$, $Mg(C_2H_5)(Cl)$, $Mg(C_2H_5)(Br)$, etc. Mixtures of hydrocarbyl magnesium compounds also can be employed if desired. From the standpoint of cost and availability, dihydrocarbyl magnesium compounds preferred for this use are those of the formula $MgR'_2$ wherein R' is as defined above. In terms of catalytic activity and stereospecificity, best results are achieved through the use of hydrocarbyl magnesium halide compounds of the formula MgR'Q' wherein R' is an alkyl radical of 1 to about 18 carbon atoms, an aryl radical of 6 to about 12 carbon atoms or an alkaryl or aralkyl radical of 7 to about 12 carbon atoms and Q' is chloride or bromide.

Preferably, the magnesium-containing compound is a magnesium alcoholate, and the resulting magnesium-containing species is a magnesium hydrocarbyl carbonate.

More preferably, a magnesium alcoholate is employed that is prepared by reacting magnesium metal turnings to completion with a lower molecular weight alcohol, such as methanol, ethanol, or 1-propanol, with or without a catalyst such as iodine or carbon tetrachloride, to form a solid magnesium alcoholate. Any excess alcohol is removed by filtration, evaporation or decantation. Use as the magnesium-containing compound of a magnesium alcoholate produced in this manner affords a solution of the magnesium-containing species formed from it in step A of this invention that has a substantially reduced viscosity and hence is easier to work with, and also affords a catalyst or catalyst component of this invention having a substantially greater mean particle size relative to the use of a magnesium alcoholate produced by any different known method.

Diluents or solvents suitable for use in the carbonation of the magnesium compounds to form the magnesium-containing species include alcohols containing from 1 to 12 carbon atoms, non-polar hydrocarbons and halogenated derivatives thereof, ethers and mixtures thereof that are substantially inert to the reactants employed and, preferably, are liquid at the temperatures of use. It also is contemplated to conduct the reaction at elevated pressure so that lower-boiling solvents and diluents can be used even at higher temperatures. Examples of useful solvents and diluents include alcohols such as methanol, ethanol, 1- or 2-propanol, t-butyl alcohol, benzyl alcohol, the amyl alcohols, 2-ethylhexanol and branched alcohols containing 9 or 10 carbon atoms; alkanes such as hexane, cyclohexane, ethylcyclohexane, heptane, octane, nonane, decane, undecane, and higher molecular weight paraffins, including iso-paraffins such as Isopar G ® and Isopar H ®; haloalkanes such as 1,1,2-trichloroethane, carbon tetrachloride; aromatics such as toluene, xylenes and ethylbenzene; and halogenated and hydrogenated aromatics such as chlorobenzene, o-dichlorobenzene, tetrahydronaphthalene and decaydronaphthalene.

In somewhat greater detail, the magnesium-containing species is prepared by dissolving or suspending the magnesium-containing compound in a liquid. Approximately 10 to 80 parts by weight of the magnesium-containing compound is employed per 100 parts by weight liquid. A sufficient amount of carbon dioxide is bubbled into the liquid suspension to provide from about 0.1 to 4 moles of carbon dioxide per mole of the magnesium compound with mild stirring. Approximately 0.3 to 4 moles of carbon dioxide are added to the solution or suspension of the magnesium-containing compound with stirring at a temperature of about 0° to 100° C. over a period of approximately 10 minutes to 24 hours.

Regardless of which of the aforesaid magnesium-containing compounds was employed to form the magnesium-containing species, solid particles are next precipitated in step B from the aforesaid solution of the magnesium-containing species by treatment of the solution with a transition metal halide and preferably additionally with a morphology controlling agent. The transition metal halide preferably is a titanium (IV) halide and more preferably is titanium tetrachloride. While any convenient conventional morphology controlling agent can be employed, organosilanes are particularly suitable for use as the morphology controlling agent. Suitable organosilanes for this purpose have a formula: $R_nSiR'_{4-n}$, wherein $n=0$ to 4 and wherein R is hydrogen or an alkyl, alkoxy, haloalkyl or aryl radical containing one to about ten carbon atoms, or a halosilyl-radical or haloalkylsilyl radical containing one to about eight carbon atoms, and R' is OR or a halogen. Typically, R is an alkyl or chloroalkyl radical containing one to about eight carbon atoms and one to about four chlorine atoms, and R' is chlorine or an -OR radical containing one to four carbon atoms. A suitable organosilane may contain different R' groups. Mixtures of organosilanes may be used. Preferable organosilanes include trimethylchlorosilane, trimethylethoxysilane, dimethyldichlorosilane, tetraethoxysilane, and hexamethyldisiloxane.

In this treatment of the soluble magnesium-containing species, the titanium (IV) halide component and organosilane component are contacted in amounts such that the atomic ratio of magnesium to titanium is at least about 0.3:1 and preferably, is from about 0.4:1 to about 20:1 and more preferably, from about 0.5:1 to about 3:1. The atomic ratio of silicon to titanium typically ranges from about 0.1:1 to about 2.0:1, and preferably is about 0.3:1 to about 1:1.

Broadly, in accordance with this invention, the particles precipitated in step B are treated with a transition metal compound and an electron donor. Suitable transition metal compounds which can be used for this purpose include compounds represented by the formula $T_aY_bX_{c-b}$ wherein $T_a$ is a transition metal selected from Groups IV-B, V-B and VI-B of the Periodic Table of Elements, Y is oxygen, OR' or $NR'_2$; wherein each R' is independently hydrogen or hydrocarbyl group of 1 to 20 carbon atoms; X is halogen, preferably chlorine or bromine; c has a value corresponding to the valence of the transition metal, $T_a$; b has a value of from 0 to 5 with a value of $c-b$ being from at least 1 up to the value of the valence state of the transition metal $T_a$. Suitable transition metal compounds include halide compounds of titanium, zirconium, vanadium and chromium, such as chromyl chloride, vanadium oxytrichloride, zirconium tetrachloride, vanadium tetrachloride, etc.

Titanium (IV) compounds useful in preparation of the catalyst or catalyst component employed in the method of this invention are titanium halides and haloalcoholates having 1 to about 20 carbon atoms per alcoholate group such as methoxy, ethoxy, butoxy, hexoxy, phenoxy, decoxy, naphthoxy, dodecoxy and eicosoxy. Mixtures of titanium compounds can be employed if desired. Preferred titanium compounds are the halides and haloalcoholates having 1 to 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides and particularly $TiCl_4$ are most preferred from the standpoint of attaining maximum activity and stereospecificity.

Organic electron donors useful in preparation of the stereospecific supported catalyst components employed in the method of this invention are organic compounds containing oxygen, nitrogen, sulfur, and/or phosphorus. Such compounds include organic acids, organic acid anhydrides, organic acid esters, alcohols, ethers, aldehydes, ketones, amines, amine oxides, amides, thiols, various phosphorus acid esters and amides, and the like. Mixtures of organic electron donors can be employed if desired.

Specific examples of useful oxygen-containing electron donors include the organic acids and esters employed as modifiers as described above, aliphatic alcohols such as methanol, ethanol, propanols, butanols, pentanols, hexanols, and so forth, aliphatic diols and triols such as ethylene glycol, propanediols, glycerol, butanediols, butanetriols, pentanediols, pentanetriols, hexanediols, hexanetriols, and so forth; aromatic alcohols such as phenol, di-, tri-, and tetrahydroxybenzenes, naphthols, and dihydroxynaphthalenes; aralkyl alcohols such as benzyl alcohol, phenylethanols, phenylpropanols, phenylbutanols, phenylpentanols, phenylhexanols, and so forth; alkaryl alcohols such as cresols, xylenols, ethylphenols, propylphenols, butylphenols, pentylphenols, hexylphenols, and so forth; dialkyl esters such as dimethyl, diethyl, methylethyl, dipropyl, dibutyl, dipentyl, dihexyl ethers, and so forth; alkylvinyl and alkylallyl ethers such as methyl-, ethyl-, propyl-, butyl-, pentyl-, and hexylvinyl, and hexylallyl ethers; alkaryl ethers such as anisole, phenetol, propylphenyl ether, butylphenyl ether, pentylphenyl ether, hexylphenyl ether and so forth; arylvinyl and arylallyl ethers such as phenylvinyl ether and phenylallyl ether; diaryl ethers such as diphenyl ether; and cyclic ethers such as dioxane and trioxane.

Specific examples of other suitable oxygen-containing organic electron donors include aldehydes such as formaldehyde, acetaldehyde, propionaldehyde, butyraldehyde, valeraldehyde, caproaldehyde, and so forth, benzylaldehyde, tolualdehyde, and alpha-tolualdehyde;

and ketones such as acetone, diethyl ketone, methyl ethyl ketone, dipropyl ketone, dibutyl ketone, dipentyl ketone, dihexyl ketone, and so forth, cyclobutanone, cyclopentanone, and cyclohexanone, acetophenone, propiophenone, butyrophenone, valerophenone, caprophenone, and so forth, and benzophenone.

Specific examples of useful nitrogen-containing organic electron donors include tertiary amines wherein at least one of the groups bonded to nitrogen contains at least two carbon atoms such as dimethylethylamine, methyldiethylamine, N,N'-tetramethylethylenediamine, triethylamine, tri-n-butylamine, dimethyl-n-hexylamine, diphenylmethylamine, triphenylamine, tritolylamine, diphenylbenzylamine, diphenylethylamine, diethylphenylamine, bis(diethylamino)benzenes, and the like; saturated heterocyclic amines and derivatives thereof such as pyrrolidine, piperidine, 2-methylpyrrolidine, 2-methylpiperidine, 2,5-dimethylpyrrolidine, 2,6-dimethylpiperidine, 2,4,6-trimethylpiperidine, 2,2,6,6-tetramethylpiperidine, and the like; unsaturated heterocyclic amines and derivatives thereof such as pyridine and pyrimidine, picolines, lutidines, collidines, ethylpyridines, diethylpyridines, triethylpyridines, benzylpyridines, methylpyrimidines, ethylpyrimidines, benzylpyrimidines, and the like.

Examples of useful sulfur containing organic electron donors include thiols such a methanethiol, ethanethiol, ethanedithiol, propanethiols, butanethiols, butanedithiols, hexanethiols, and the like, thioethers such as ethylthioethane, ethylthio-n-butane, and the like; and other thio analogues of the above-described oxygen-containing organic electron donors.

Specific examples of useful phosphorus-containing organic electron donors include phosphorus analogues of the above-described nitrogen-containing organic electron donors such as triethylphosphine, ethyldibutylphosphine, triphenylphosphine, and the like.

Examples of useful organic electron donors containing two or more of oxygen, nitrogen, sulfur, and phosphorus include amides such as acetamide, butyramide, caproamide, benzamide, and the like, aminoalcohols such as ethanolamine, hydroxyanilines, aminocresols, and the like; amine oxides such as lutidine-N-oxides and collidine-N-oxides; aminoethers such as bis(2-ethoxyethyl)amine thioacids such as thioacetic acid, thiobutyric acid, thiovaleric acid, thiobenzoic acid, and the like; organosulfonic acids such as methanesulfonic acid, ethanesulfonic acid, phenylsulfonic acid, and the like; various phosphorus acid derivatives such as trimethyl phosphite, tri-n-propyl phosphite, triphenyl phosphite, tri(ethylthio)phosphite, hexamethylphosphoric triamide, and the like; and phosphine oxides such as trimethylphosphine oxide, triphenylphosphine oxide, and the like.

From the standpoint of catalyst performance and preparative ease, the organic electron donors which are preferred according to this invention are $C_1$-$C_6$ alkyl esters of aromatic carboxylic acids and halogen-, hydroxyl-, oxo-, alkyl, alkoxy-, and/or aryloxy-substituted aromatic monocarboxylic acids. Among these, the alkyl esters of benzoic, halobenzoic, phthalic, terephthalic and isophthalic acids wherein the alkyl group contains 1 to 6 carbon atoms, such as methyl benzoate, methyl bromobenzoate, ethyl benzoate, ethyl chlorobenzoate, ethyl bromobenzoate, ethyl benzoate, ethyl chlorobenzoate, ethyl bromobenzoate, butyl benzoate, isobutyl benzoate, diisobutyl phthalate, hexyl benzoate, and cyclohexyl benzoate are particularly preferred. Best results are attained through the use of diesters.

In step C, the particles formed in Step B, the transition metal component, and organic electron donor component are reacted at temperatures ranging from about $-10°$ C. to about 170° C., generally over a period of several minutes to several hours, and are contacted in amounts such that the atomic ratio of transition metal to magnesium in the particles (calculated as magnesium in magnesium compound from which the magnesium-containing species is formed) is at least about 0.5:1. Preferably, this ratio ranges from about 0.5:1 to about 20:1. Greater amounts of transition metal can be employed without adversely affecting catalyst component performance, but there typically is no need to exceed a transition metal to magnesium ratio of about 20:1 as only a portion of the transition metal is affixed to the pretreatment product during the preparative reaction. More preferably, the titanium to magnesium ratio ranges from about 2:1 to about 15:1 to ensure that the catalyst components contain sufficient titanium to exhibit good activities without being wasteful of the titanium compound employed in preparation. The electron donor component is employed in an amount ranging up from about 1.0 mole per gram atom of transition metal in the transition metal compound, and preferably from about 0.001 to about 0.6 mole per gram atom of titanium in the transition metal compound. Best results are achieved when this ration ranges from about 0.01 to about 0.3 mole per gram atom of titanium. The atomic ratio of metal in the Group II or IIIA metal alkyl component to metal in the magnesium hydrocarbyl carbonate component ranges from about 0.001:1 to about 1:1. Preferably, this ratio ranges from about 0.005:1 to about 0.5:1 to provide the best catalyst performance.

It is preferred that the electron donor compound and transition metal compound can be contacted with the precipitated solid particles in the presence of an inert hydrocarbon or halogenated diluent, although other suitable techniques can be employed. Suitable diluents are those materials which are disclosed hereinabove as useful as diluents in steps A or B and which are substantially inert to the components employed and are liquid at the temperature employed or can be maintained in the liquid state through the use of elevated pressure.

In a highly preferred embodiment of the present invention, prior to step C, the particles precipitated in step B are reprecipitated from a solution containing a cyclic ether, and then the reprecipitated particles are treated in step C with a transition metal compound and an electron donor.

In a typical reprecipitation procedure, the particles precipitated in step B are entirely solubilized in the cyclic ether solvent and then particles are allowed to reprecipitate to form particles of uniform size. The preferable ether is tetrahydrofuran, although other suitable cyclic ethers, such as tetrahydropyran and 2-methyltetrahydrofuran, may be used, which can solubilize the particles formed in step B. Also, thioethers such as tetrahydrothiophene can be used. In some instances, such as the use of 2,2,5,5-tetrahydrofuran and tetrahydropyran-2-methanol, reprecipitation occurs upon heating to about 130°-185° F. Other compounds may be used which act in an equivalent manner, i.e., materials which can solubilize the particles formed in step B and from which solid uniform particles can be reprecipitated, such as cyclohexene oxide, cyclohexanone, ethyl acetate and phenyl acetate. Mixtures of such suitable materials may also be used.

A suitable diluent that can be used in any of the aforesaid steps A, B or C or in the reprecipitation step should be substantially inert to the reactants employed and preferably is liquid at the temperature employed. It is also contemplated to conduct the particular step in question at an elevated pressure so that lower boiling diluents can be used even at higher temperatures. Typical suitable diluents are aromatic or substituted aromatic liquids, although other hydrocarbon-based liquids may be used. Aromatic hydrocarbons, such as toluene, and substituted aromatics have been found suitable. An especially suitable diluent is a halogenated aromatic such as chlorobenzene or a mixture of a halogenated aromatic such as chlorobenzene and a halogenated aliphatic such as dichloroethane. Also useful are higher boiling aliphatic liquids such as kerosene. Mixtures of diluents may be used. One useful diluent component is Isopar G ® which is a $C_{10}$-average isoparaffinic hydrocarbon boiling at 156°–176° C. Other examples of useful diluents include alkanes such as hexane, cyclohexane, ethylcyclohexane, heptane, octane, nonane, decane, undecane, and the like; haloalkanes such as 1,2-dichloroethane, 1,1,2-trichloroethane, carbon tetrachloride and the like; aromatics such as benzene, toluene, xylenes and ethylbenzene; and halogenated and hydrogenated aromatics such as chlorobenzene and o-dichlorobenzene.

Each of the aforesaid steps A, B and C and the aforesaid reprecipitation step is conducted in the substantial absence of water, oxygen, carbon monoxide, and other extraneous materials capable of adversely affecting the performance of the catalyst or catalyst component of this invention. Such materials are conveniently excluded by carrying out the pretreatment in the presence of an inert gas such as nitrogen or argon, or by other suitable means. Optionally, all or part of the process can be conducted in the presence of one or more alpha-olefins which, when introduced into the preparative system in gaseous form, can serve to exclude catalyst poisons. The presence of one or more alpha-olefins also can result in improved stereospecificity. Useful alpha-olefins include ethylene, propylene, butene-1, penetene-1, 4-methylpentene-1, hexene-1, and mixtures thereof. Of course, any alpha-olefin employed should be of relatively high purity, for example, polymerization grade or higher. Other precautions which aid in excluding extraneous poisons include purification of any diluent to be employed, such as by percolation through molecular sieves and/or silica gel prior to use, and drying and/or heating of reactant.

As a result of the above-described preparation there is obtained from step C a solid reaction product suitable for use as a catalyst or catalyst component. Prior to such use, it is desirable to remove incompletely-reacted starting materials from the solid reaction product from step C. This is conveniently accomplished by washing the solid from step C, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance.

Although not required, the solid reaction product prepared from step C may be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the solid reaction product from step C. Preferred Lewis acids include halides of Group III-V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixture of Lewis acids can be employed if desired. Such Lewis acid may be used in a compatible diluent.

Although not required, the solid reaction product from step C may be washed with an inert liquid hydrocarbon or halogenated hydrocarbon before contact with a Lewis acid. If such a wash is conducted, it is preferred to substantially remove the inert liquid prior to contacting the washed solid with Lewis acid.

Although the chemical structure of the catalyst or catalyst components employed in the method of this invention is not known precisely, the components generally comprise from about 1 to about 6 wt. % titanium, from about 10 to about 25 wt. % magnesium, and from about 45 to about 65 wt. % halogen. Preferably, the catalyst components employed in the method of this invention comprise from about 2.0 to about 4 wt. % titanium, from about 15 to about 21 wt. % magnesium and from about 55 to about 65 wt. % chlorine.

The invention described herein is illustrated, but not limited, by the following examples.

EXAMPLES 1–38

The solid catalyst employed in each of Examples 1–37 and Comparative Examples A–D was prepared by the procedure of Example 17 in the aforesaid Arzoumanidis et al., U.S. Pat. No. 4,866,022, except that the magnesium hydrocarbyl carbonate solution was prepared by the following procedure. A mixture of 153 grams of magnesium ethoxide, 276 milliliters of 2-ethyl-1-hexanol and 1100 milliliters of toluene was introduced into a 2-liter Buchi reactor that had been purged with dry nitrogen. The mixture was agitated at 450 revolutions per minute under 30 pounds per square inch gauge pressure of carbon dioxide, and heated at 93° C. for 3 hours. A solution having a total volume of 1530 milliliters and containing 0.10 gram-equivalent of magnesium ethoxide per milliliters of solution was obtained, and was transferred to a 2-liter bottle. The high activity solid catalyst employed in Example 38 is the TK Catalyst Component (grade 200) commercially produced by Akzo Chemicals, Inc.

Polymerizations of propylene in the presence of a catalyst system comprising one or the other of these solid catalysts were performed in a 2-liter batch reactor which had been purged with propylene. To start, appropriate amounts of first a solution of 15 weight percent of triethyl aluminum, second and separately, a 0.1 molar solution of a silane in hexane, third and separately, 15 milligrams of the aforesaid solid catalyst, and, fourth and separately, 3–5 milliliters of hexane were added under a nitrogen blanket to a catalyst transfer tube. An appropriate amount of a solution of an ester external modifier in hexane was added to a second transfer tube. The catalyst transfer tube was sealed and attached to the purged reactor. The tube was opened, and its contents were flushed into the reactor with about 350 milliliters of hexane. The reactor contents were agitated and an appropriate amount of hydrogen was introduced to the reactor, and the ester external modifier was flushed into the reactor with about 350 milliliters of hexane. The reactor was pressurized to 90 pounds per square inch gauge with propylene, and heating of its contents was begun. When the temperature of the contents of the reactor reached 68.3° C., the reactor was pressurized to, and maintained at, 160 pounds per square inch with propylene. After a desired period of time measured from the time when the reaction temperature reached 71° C. the level of hydrogen in the reactor was either (a) decreased (in Examples 1-11, 18-33, 37 and 38 and Comparative Examples A-D) by venting the reactor to a pressure of about 80-90 pounds per square inch gauge and then repressurizing the reactor to 160 pounds per square inch gauge and continuing the reaction for another desired period of time, or (b) increased (in Examples 12-17 and 34-36) by adding additional hydrogen to the reactor and continuing the reaction for another desired period of time. Polymers were isolated by filtration of the slurry at room temperature and dried.

The experimental parameters and results of Examples 1-38 and Comparative Examples A-D are presented in Tables 1-4. Each of Examples 1-11, 18-33, 37 and 38 and Comparative Examples A-D was performed by reducing the hydrogen concentration from the first stage to the second stage, where in fact no hydrogen was added. Thus, in Tables 1-4, for such examples only the hydrogen added in the first stage is presented, but for all other examples, the amount of hydrogen in grams added per gram of catalyst in each stage is indicated.

TABLE 1

| Example | Hydrogen Added (g/g Cat.) | Time Ratio | Silane | Ester | Al/Si/E/Ti | C.M.F.M. (psi) | $M_w$ | $M_w/M_n$ | M. Pt. (°C.) | $\Delta H_f$ (cal/g) | % m | MFR | I.M.F.M. (psi) |
|---|---|---|---|---|---|---|---|---|---|---|---|---|---|
| A | 1.90 | 100/0 | None | EPT | 300/0/60/1 | 216,500 | 262,000 | 5.4 | 155.0 | 20.7 | 89.7 | — | |
| B | 0.95 | 100/0 | DIBDMS | None | 300/30/0/1 | 223,400 | 395,000 | 5.2 | 160.0 | 22.1 | 96.9 | 3.0 | |
| C | 1.90 | 100/0 | DIPDMS | None | 300/30/0/1 | 290,000 | — | — | — | — | — | — | |
| D | 0.95 | 100/0 | DIPDMS | EPT | 300/30/60/1 | 257,100 | 441,000 | 6.4 | 160.3 | 23.6 | 95.4 | — | |
| 1 | 9.5 | 33/67 | DIPDMS | None | 300/60/0/1 | 291,400 | 257,000 | 8.9 | 161.0 | 24.7 | 98.4 | 16.5 | |
| 2 | 7.6 | 33/67 | DIPDMS | None | 300/30/0/1 | 291,900 | 396,000 | 7.8 | 161.4 | 23.8 | 98.2 | 7.2 | |
| 3 | 15.2 | 33/67 | DTBDMS | None | 300/60/0/1 | 288,800 | 428,000 | 9.8 | 161.2 | 24.4 | 97.5 | 4.6 | |
| 4 | 13.3 | 33/67 | DTBDMS | EPT | 300/30/60/1 | 325,200 | 283,000 | 9.4 | 161.1 | 25.5 | 98.0 | 29.7 | |
| 5 | 24.6 | 17/83 | DTBDMS | EPT | 300/30/60/1 | 301,900 | 273,000 | 9.9 | 161.5 | 26.0 | 97.8 | 18.7 | |
| 6 | 13.3 | 33/67 | DTBDMS | EPT | 300/30/60/1 | 302,900 | 332,000 | 10.7 | 162.5 | 26.3 | — | 10.8 | |
| 7 | 17.1 | 33/67 | DTBDMS | EPT | 300/30/60/1 | 306,500 | 276,000 | 11.8 | 161.5 | 26.4 | 97.9 | 26.8 | |
| 8 | 13.3 | 33/67 | DTBDMS | EPT | 300/30/60/1 | 308,600 | 350,000 | 11.5 | 163.2 | 25.3 | 97.7 | 9.6 | |
| 9 | | | | | | 300,300 | 327,000 | 10.8 | 162.3 | 25.3 | 97.6 | 11.0 | 283,100 |
| 10 | 13.3 | 33/67 | DIPDMS | EPT | 300/30/60/1 | 336,800 | 201,000 | 7.6 | 162.0 | 24.4 | 97.9 | 45 | |
| 11 | | | | | | 340,000 | 210,000 | 7.5 | 163.9 | 27.3 | 98.6 | 48 | 287,900 |

TABLE 2

| Example | Hydrogen Added (g/g Cat.) | Time Ratio | Silane | Ester | Al/Si/E/Ti | C.M.F.M. (psi) | $M_w$ | $M_w/M_n$ | M. Pt. (°C.) | $\Delta H_f$ (cal/g) | % m | MFR | I.M.F.M. (psi) |
|---|---|---|---|---|---|---|---|---|---|---|---|---|---|
| 12 | 0/9.5 | 33/67 | DIBDMS | None | 300/30/0/1 | 275,300 | 332,000 | 10.4 | 160.0 | 24.7 | 97.0 | — | |
| 13 | 0.95/19.0 | 50/50 | DIBDMS | EPT | 300/30/60/1 | 286,600 | 306,000 | 9.2 | 160.6 | 24.7 | — | — | |
| 14 | 0/15.9 | 33/67 | DTBDMS | EPT | 300/30/60/1 | 289,300 | 523,000 | 21.8 | 162.5 | 26.4 | 97.9 | 1.0 | |
| 15 | 1.9/22.7 | 33/67 | DTBDMS | EPT | 300/30/60/1 | 289,300 | 330,000 | 11.8 | 162.7 | 25.5 | 97.8 | 9.1 | |
| 16 | 15.2[1] | 33/67 | DIPDMS | EPT | 300/30/60/1 | — | — | — | 160.5 | 24.8 | 97.4 | 10.7 | |
| 17 | | | | | | 322,700 | 329,000 | 10.2 | 161.7 | 25.2 | — | 9.1 | 267,300 |

Footnote: [1]Composite sample produced using 0.47 gH₂/g Cat for 60% of polymer and 0.95 gH₂/g Cat for the remaining 40% of the polymer in the first stage.

TABLE 3

| Example | Hydrogen Added (g/g Cat.) | Time Ratio | Silane | Ester | Al/Si/E/Ti | C.M.F.M. (psi) | $M_w$ | $M_w/M_n$ | M. Pt. (°C.) | $\Delta H_f$ (cal/g) | % m | MFR | % Ext. |
|---|---|---|---|---|---|---|---|---|---|---|---|---|---|
| 18 | 11.4 | 33/67 | DIPDMS | EPT | 300/30/3/1 | 265,100 | 224,000 | 5.5 | 160.4 | 23.7 | 97.6 | 30 | 0.68 |
| 19 | 11.4 | 33/67 | DIPDMS | EPT | 300/30/15/1 | 273,400 | 271,000 | 7.2 | 161.2 | 25.9 | 98.0 | 17 | 0.75 |
| 20 | 11.4 | 33/67 | DIPDMS | EPT | 300/30/60/1 | 301,300 | 277,000 | 8.5 | 160.9 | 24.4 | 98.0 | 20 | 0.25 |
| 21 | 11.3 | 33/67 | DIPDMS | EPT | 300/30/60/1 | 309,700 | 258,000 | 8.2 | 161.2 | 26.8 | 98.4 | — | — |
| 22 | 11.4 | 33/67 | DIPDMS | EPT | 300/30/150/1 | 332,400 | 207,000 | 6.7 | 161.7 | 26.2 | 98.3 | — | — |
| 23 | 11.4 | 33/67 | DIPDMS | NDMC | 300/30/10/1 | 300,700 | 285,000 | 9.5 | — | — | — | 17 | 0.61 |
| 24 | 11.4 | 33/67 | DIPDMS | NDMC | 300/30/60/1 | 335,100 | 246,000 | 8.2 | — | — | — | — | — |
| 25 | 9.5 | 33/67 | DIPDMS | EPV | 300/30/60/1 | 306,800 | 304,000 | 7.2 | 161.5 | 25.2 | 98.2 | 11.7 | — |
| 26 | 11.4 | 33/67 | DIPDMS | EPV | 300/30/60/1 | 291,900 | 224,000 | 5.7 | 161.9 | 26.1 | 97.5 | 23 | 0.96 |
| 27 | 11.4 | 33/67 | DIPDMS | MTBB | 300/30/60/1 | 302,800 | 272,000 | 8.8 | — | — | — | 16 | 0.45 |
| 28 | 7.6 | 27/73 | DIPDMS | TBB | 300/30/30/1 | 295,400 | 409,000 | 8.9 | 162.1 | 24.7 | 97.7 | 6.6 | 1.03 |
| 29 | 7.6 | 33/67 | DIPDMS | TBB | 300/30/60/1 | 297,700 | 338,000 | 7.8 | 162.0 | 24.8 | 98.2 | 10.6 | 1.02 |
| 30 | 7.6 | 33/67 | DIPDMS | TBB | 300/60/60/1 | 303,500 | 334,000[1] | 7.9 | 161.5 | 25.4 | 98.2 | 12.3 | 0.77 |
| 31 | 13.3 | 33/67 | DTBDMS | TBB | 300/30/30/1 | 309,300 | 353,000 | 10.8 | 161.7 | 25.0 | 97.9 | 15.2 | 1.35 |
| 32 | 13.3 | 33/67 | DTBDMS | TBB | 300/30/60/1 | 304,900 | 309,000 | 9.3 | 160.7 | 25.1 | 98.0 | 15.4 | — |

TABLE 3-continued

| Example | Hydrogen Added (g/g Cat.) | Time Ratio | Silane | Ester | Al/Si/E/Ti | C.M.F.M. (psi) | $M_w$ | $M_w/M_n$ | M. Pt. (°C.) | $\Delta H_f$ (cal/g) | % m | MFR | % Ext. |
|---|---|---|---|---|---|---|---|---|---|---|---|---|---|
| 33 | 15.2 | 33/67 | DTBDMS | TBB | 300/60/30/1 | 301,500 | 301,000 | 10.3 | 162.4 | 25.4 | 98.4 | 22.5 | 1.25 |

Footnote: [1]C.M.F.M. measured for a sample that was a combination of products formed by duplicate polymerizations under these same conditions.

TABLE 4

| Example | Hydrogen Added (g/g Cat.) a/b/c/ | Time Ratio a/b/c | Silane | Ester | Al/Si/E/Ti | C.M.F.M. (psi) | $M_w$ | $M_w/M_n$ | M. Pt. (°C.) | $\Delta H_f$ (cal/g) | % m | MFR% |
|---|---|---|---|---|---|---|---|---|---|---|---|---|
| 34 | 0.95/7.6/19.0 | 33/33/33 | DIPDMS | EPT | 300/30/60/1 | 310,800 | 352,000 | 9.4 | 161.9 | 24.5 | — | |
| 35 | 1.4/11.4/19.0 | 33/33/33 | DIPDMS | EPT | 300/30/60/1 | 308,700 | 304,000 | 10.0 | 161.0 | 23.6 | — | |
| 36 | 1.9/7.6/19.0 | 33/33/33 | DIPDMS | EPT | 300/30/60/1 | 292,500 | 243,000 | 8.0 | 160.8 | 24.4 | 98.3 | |
| 37 | 9.5 | 33/67 | DIPDMS | DNBP | 300/60/30/1 | 300,400 | 284,000 | 7.0 | 161.9 | 25.7 | 97.2 | 18 0.05 |
| 38 | 7.6 | 33/67 | DIPDMS | EPT | 300/30/60/1 | 304,700 | 218,000 | 6.3 | 162.9 | 24.8 | 97.6 | 25 |

In Examples 34–36, the second stage in which hydrogen is employed at a relatively high level is performed in two steps of sub-stages, each of which are within and comprise the aforesaid "second stage" and which are indicated in Table 4 by "b" or "c" under the heading Time Ratio and H₂ Added. The preceding or first stage in which hydrogen is employed at a relatively low level is performed in a single step which is indicated in Table 4 by "a" in the same columns. In each of Examples 1–38 and Comparative Examples A–D, the total polymerization time was 3 hours and the percentage of that total time for each stage is indicated under the heading of Time Ratio.

In Tables 1–4, under the heading of "Silanes," DIBDMS means diisobutyldimethoxysilane, DIPDMS means di-isopropyldimethoxysilane, and DTBDMS means di-t-butyldimethoxysilane. Under the heading of "Ester," EPT means ethyl-p-toluate, NDMC means 2,6-dimethylnaphthalene dicarboxylate, EPV means ethyl pivalate, TBB means t-butylbenzoate, DNBP means di-(n-butyl)phthalate, and MTBB means methyl-4-t-butylbenzoate. The composition of the catalyst system is indicated under the heading of Al/Si/E/Ti, which is the ratio of the number of moles of aluminum in the cocatalyst to the number of moles of the silane external modifier to the number of moles of the ester external modifier to the number of moles of titanium in the solid supported catalyst.

In the experimental results, C.M.F.M. is the compression-molded flexural modulus in pounds per square inch, M.Pt. is the melting point in °C., $\Delta H_f$ is the heat of fusion in calories per gram, % m is the tacticity measured as described hereinabove and reported as a percent, $M_w$ is the weight average molecular weight, the molecular weight distribution is indicated by $M_w/M_n$, which is the ratio of the weight average molecular weight to the number average molecular weight, MFR is the melt flow rate in grams per 10 minutes, I.M.F.M. is the injection molded flexural modulus, and % Ext is the percent of the total polymer product that is extracted in a 3-hour extraction with boiling hexane, except in Examples 27–32 where a 6-hour extraction with boiling hexane was employed. In each of Examples 9, 11 and 17, the experimental results reported in Tables 1 and 2 were obtained for samples that were pellets formed from the composite powder product from the preceding example—that is, from Example 8, 10 and 16, respectively.

Comparison of the results of Examples 12–17 and 34–38 with the results of Examples 1–11 and 18–33 illustrates that the objects of the present invention can be achieved regardless of whether the stage employing the high hydrogen level is performed before or after the stage employing the low hydrogen level. The results of Examples 34–36 illustrate that an increase or decrease in the hydrogen level from a first stage to a second stage can be achieved in a stepwise manner involving 2 or more smaller changes in the hydrogen level. Comparison of the results of Examples 18–20 and 25–26 illustrates that if the molecular weight distribution as indicated by $M_w/M_n$ does not reach the desired level, the desired degree of stiffness as indicated by the C.M.F.M. also may not be reached. The results of Examples 9, 11 and 17 illustrate that the improved stiffness of products formed by the method of this invention are maintained even after pelletization for both compression- and injection-molded products. The results of Example 38 illustrate that the improved stiffness of the product formed by the method of this invention is also achieved when another high activity solid catalyst component is employed in the polymerization catalyst system.

The low values for $M_w/M_n$ and C.M.F.M. in each of Examples 18 and 26 are the result of an insufficient degree of lowering the level of hydrogen from 11.4 grams per gram of catalyst in the first stage to 3 grams of hydrogen per gram of catalyst in the second stage. In all other cases where the second stage was at a relatively lower level than in the first stage, the level of hydrogen in the second stage was less than 2 and preferably less than one gram of hydrogen per gram of catalyst.

From the above description, it is apparent that the objects of the present invention have been achieved. While only certain embodiments have been set forth, alternative embodiments and various modifications will be apparent from the above description to those skilled in the art. These alternatives are considered equivalents and within the spirit and scope of the present invention.

Having described the invention, what is claimed is:

1. A method for making a homopolymer of propylene having increased stiffness and a broadened, molecular weight distribution, comprising:
polymerizing propylene in the presence of a high activity catalyst system and a silane, and in at least two stages, comprising:

(a) in one stage, producing a homopolymer of propylene having a relatively high weight average molecular weight in the range of from about 350,000 to about 4,000,000 and comprising at least about 5 weight percent of the total amount of final homopolymer of propylene produced; and (b) in another stage, either after or prior to stage (a), producing a homopolymer of propylene having a relatively low weight average molecular weight in the range of from about 50,000 to about 340,000 and comprising at least about 10 weight percent of the total amount of final homopolymer of propylene produced;

wherein the weight average molecular weight of the final homopolymer of propylene produced is in the range of from about 150,000 to about 1,500,000, and the molecular weight distribution of the final homopolymer of propylene produced is such that $M_w/M_n$ is at least 6.0;

wherein the homopolymer products formed in steps (a) and (b) comprise at least about 50 weight percent of the total amount of final homopolymer of propylene produced;

wherein the aforesaid silane is $R_1(R_2)_x Si(OR_4)_y(OR_5)_z$, wherein $R_1$ and $R_2$ are the same or different and are each isopropyl, isobutyl, t-butyl, isopentyl, t-pentyl, neopentyl, phenyl, tolyl, naphthyl, or cycloC$(R_3)_{2n-1}$, wherein cycloC is a cyclobutyl, cyclopentyl, or cyclohexyl cycloaliphatic ring attached to the silicon atom and $R_3$ is a hydrogen or an alkyl group having from 1 to 5 carbon atoms and is a substituent to the cycloaliphatic ring and wherein n is 4, 5 or 6 when the cycloaliphatic ring is cyclobutyl, cyclopentyl or cyclohexyl, respectively, wherein $R_4$ and $R_5$ are the same or different and are each methyl, isopropyl, sec- or t-butyl, and wherein y is 1, 2 or 3, z is 0 or 1, y+z is 2 or 3, and x is 3-(y+z);

wherein a molecular weight control agent is employed in at least one of stage (a) and stage (b) in a sufficient amount that a homopolymer of propylene having a molecular weight in the respective molecular weight range for such stage is produced; and wherein the aforesaid catalyst system comprises a supported catalyst comprising a solid hydrocarbon-insoluble composite of a titanium-containing component supported on a magnesium-containing compound and a cocatalyst comprising a Group II or III metal alkyl.

2. The method of claim 1 wherein the polymerization in each stage is performed in the gas phase.

3. The method of claim 1 wherein in each of the stages (a) and (b), the polymerization takes place in at least one reactor.

4. The method of claim 1 wherein the polymerization is performed in two stages.

5. The method of claim 1 wherein the polymerization is performed in stage (b) prior to the polymerization in stage (a).

6. The method of claim 1 wherein the polymerization is performed in stage (a) prior to the polymerization in stage (b).

7. The method of claim 1 wherein the homopolymer of propylene produced in stage (a) has a weight average molecular weight in the range of from about 600,000 to about 2,000,000.

8. The method of claim 1 wherein the homopolymer of propylene produced in stage (a) comprises from about 10 to about 70 weight percent of the total amount of final homopolymer of propylene produced.

9. The method of claim 1 wherein a molecular weight control agent is employed in stage (a).

10. The method of claim 9 wherein the molecular weight control agent is hydrogen.

11. The method of claim 1 wherein the homopolymer of propylene produced in stage (b) has a weight average molecular weight in the range of from about 100,000 to about 250,000.

12. The method of claim 1 wherein the homopolymer of propylene produced in stage (b) comprises from about 20 to about 80 weight percent of the total amount of final homopolymer of propylene produced.

13. The method of claim 1 wherein a molecular weight control agent is employed in stage (b).

14. The method of claim 13 wherein the molecular weight control agent is hydrogen.

15. The method of claim 1 wherein the molecular weight of the final homopolymer of propylene produced is in the range of from about 200,000 to about 700,000.

16. The method of claim 1 wherein the molecular weight distribution of the final homopolymer of propylene produced is such that $M_w/M_n$ is from about 7 to about 50.

17. The method of claim 1 wherein the products formed in stage (a) and (b) combined comprise at least 70 weight percent of the total amount of final homopolymer of propylene produced.

18. The method of claim 1 wherein in the formula for the silane, z is 0, y is 2, $R_4$ is methyl or t-butyl, x is 1, and $R_1$ and $R_2$ are the same or different and are each isopropyl, isobutyl, t-butyl, isopentyl, t-pentyl or neopentyl.

19. The method of claim 18 wherein the silane is selected from the group consisting of diisopropyldimethoxysilane, diisobutyldimethoxysilane, and di-t-butyldimethoxysilane.

20. The method of claim 1 wherein the catalyst system additionally comprises an organic acid ester as an external modifier.

21. The method of claim 20 wherein the organic acid ester is an alkyl, alicyclic, alkenyl, aryl, alkaryl or aralkyl mono-, di- or tri-ester of an aliphatic or aromatic carboxylic acid or of an alkyl, halo-, haloalkyl, hydroxy-, oxoalkyl-, alkoxy-, or aryloxy-substituted aromatic carboxylic acid.

22. The method of claim 1 wherein the magnesium-containing support is formed by (a) forming a magnesium-containing species by reacting a magnesium-containing compound with carbon dioxide or sulfur dioxide and forming a solution of the magnesium-containing species in a liquid and (b) precipitating solid particles from the solution of the magnesium-containing species by treatment with a transition metal halide.

23. The method of claim 22 wherein the magnesium-containing species is selected from the group consisting of a magnesium hydrocarbyl carbonate and a magnesium carboxylate.

24. The method of claim 1 wherein the polymerization is performed in the slurry or bulk phase.

* * * * *